United States Patent [19]

Yamaguchi

[11] Patent Number: 4,797,751
[45] Date of Patent: Jan. 10, 1989

[54] ELECTRONIC CAMERA APPARATUS FOR RECORDING AND REPRODUCING MOVING OBJECT IMAGES

[75] Inventor: Yoshihisa Yamaguchi, Tokyo, Japan

[73] Assignee: Yamaguchi Cinema Corporation, Tokyo, Japan

[21] Appl. No.: 874,550

[22] Filed: Jun. 16, 1986

[30] Foreign Application Priority Data

Jun. 19, 1985 [JP] Japan ............................ 60-133355
Jun. 19, 1985 [JP] Japan ............................ 60-133356
Jun. 19, 1985 [JP] Japan ............................ 60-133357
Jun. 19, 1985 [JP] Japan ............................ 60-133358

[51] Int. Cl.$^4$ ............................................. H04N 5/91
[52] U.S. Cl. ................................. 358/335; 358/906; 360/33.1; 346/107 B
[58] Field of Search ............... 358/310, 335, 337, 339, 358/903, 906; 360/9.1, 35.1, 33.1; 354/109; 346/107 A, 107 B

[56] References Cited

U.S. PATENT DOCUMENTS

| | | | |
|---|---|---|---|
| 4,334,241 | 6/1982 | Kashioka et al. | 358/903 X |
| 4,396,944 | 8/1983 | McKenney et al. | 358/903 X |
| 4,420,773 | 12/1983 | Toyoda et al. | 358/906 X |
| 4,456,931 | 6/1984 | Toyoda et al. | 358/906 X |
| 4,523,204 | 6/1985 | Bovay | 354/109 X |
| 4,551,764 | 11/1985 | Ogawa | 358/906 X |
| 4,574,319 | 3/1986 | Konishi | 358/906 X |
| 4,581,652 | 4/1986 | Kinoshita et al. | 358/906 X |
| 4,584,613 | 4/1986 | Amari et al. | 358/906 X |
| 4,604,668 | 8/1986 | Lemelson | 358/906 X |

Primary Examiner—Raymond F. Cardillo
Assistant Examiner—W. R. Young
Attorney, Agent, or Firm—Kane, Dalsimer, Sullivan, Kurucz, Levy, Eisele and Richard

[57] ABSTRACT

A video recording and reproducing apparatus comprises a line sensor camera having a line scan image sensor which is scanned along a predetermined standard line and receives an image of a moving object passing the standard line. An output video signal of the line sensor camera is converted by an A/D converter into a series of picture element data which are successively stored into a video memory to form therein a plurality of pictures. A control circuit selects in accordance with selection information supplied from a control box a desired one of the plurality of stored pictures, and reads the picture element data of the desired picture from the video memory. The picture element data thus read from the video memory are successively converted into analog video signals which are supplied through a mixing circuit to a display unit to thereby display the picture on the display unit.

9 Claims, 6 Drawing Sheets

ELECTRONIC CAMERA APPARATUS FOR RECORDING AND REPRODUCING MOVING OBJECT IMAGES

BACKGROUND OF THE INVENTION

1. Field of the Invention

This invention relates to an electronic camera apparatus for recording and reproducing moving object images used for a decision of arrival order for horse races such as thoroughbred races and harness races, bicycle races, speedboat races, auto races or the like, or used for recognition of the shapes of objects moving with high speeds, or used for reading characters moving with high speeds.

2. Description of the Prior Art

Heretofore, slit cameras have been used for the decision of arrival order for the horse races, bicycle races or the like.

FIG. 1 shows schematic constitution of such a slit camera.

Referring to FIG. 1, the reference numeral 1 denotes a lens; 2 a slit plate provided with a slit 2a; and 3 a film. These are housed in a camera casing C and so positioned that an image of an object above the goal line 4 is formed on the film 3 through the lens 1 and the slit 2a.

Accordingly, if the film 3 is moved and wound under the condition that the moving film is opposite in direction to the moving object (race horse here) 5 passing above the goal line 4 but corresponds in speed to the moving object 5, an image of only moving objects passing above the goal line 4 is to be formed on the film 3 continuously with the passage of time.

In contrast, an image of stationary objects (e.g. a background) above the goal line 4 always passes through the slit 2a and reached the film 3; this image is dispersed along the moving direction of the film 3 to form no actual figure.

The thus exposed film 3 is developed and thereafter used as useful data for a decision of arrival order for a plurality of moving objects 5 passing above the goal line 4.

A speedy decision of arrival order has been desired for the horse race, bicycle rases or the like.

The method of deciding arrival order using such a slit camera, however, has the following restrictions: the slit camera C should be located on an unobstructed line M above the goal line 4; and the film 3 should be taken out from the slit camera after all the moving objects 5 have passed above the goal line 4, and developed to obtain a exposed film 3 which is to be handed over to a judge as data for decision.

Accordingly, a certain extent of time is needed from the last arrival of the moving objects 5 to the handing-over of the developed film 3 to the judge, even where there is used a film 3 which can be processed by the high speed developing. Such a required time prevents the speeding up through the decision work.

Furthermore, the judge should search the film 3 for the required part for the decision to decide the arrival order for the moving objects 5; the decision work is complicated.

SUMMARY OF THE INVENTION

In view of the prior art described above, it is accordingly an object of the present invention to provide an electronic camera apparatus for recording and reproducing moving object images which permits the decision work to be done rapidly and easily.

The present invention provides a video recording and reproducing apparatus comprising: a line sensor camera having a line scan image sensor which is scanned along a predetermined standard line and receives an image of a moving object passing the standard line; first converter means for successively converting an output video signal of the line sensor camera into picture element data; storage means for successively storing the picture element data, for a plurality of pictures, supplied from the first converter means; selection means for selecting a desired picture from the plurality of the pictures; read means for successively reading the picture element data corresponding to the selected picture by the selection means from the picture element data for the plurality of the pictures written on the storage means; second converter means for converting the picture element data read by the read means into a video signal; and display means for displaying a picture image in response to the video signal supplied from the second converter means.

This constitution permits the picture element data corresponding to the image of the moving object to be successively stored in the storage means simultaneously as the moving object passes the standard line.

This constitution further permits the picture element data corresponding to the desired picture selected by the selection means from the picture element data corresponding to the plurality of the pictures written temporarily on the storage means to be read and displayed by the display means.

DESCRIPTION OF THE EMBODIMENTS OF THE INVENTION

Figure 1:
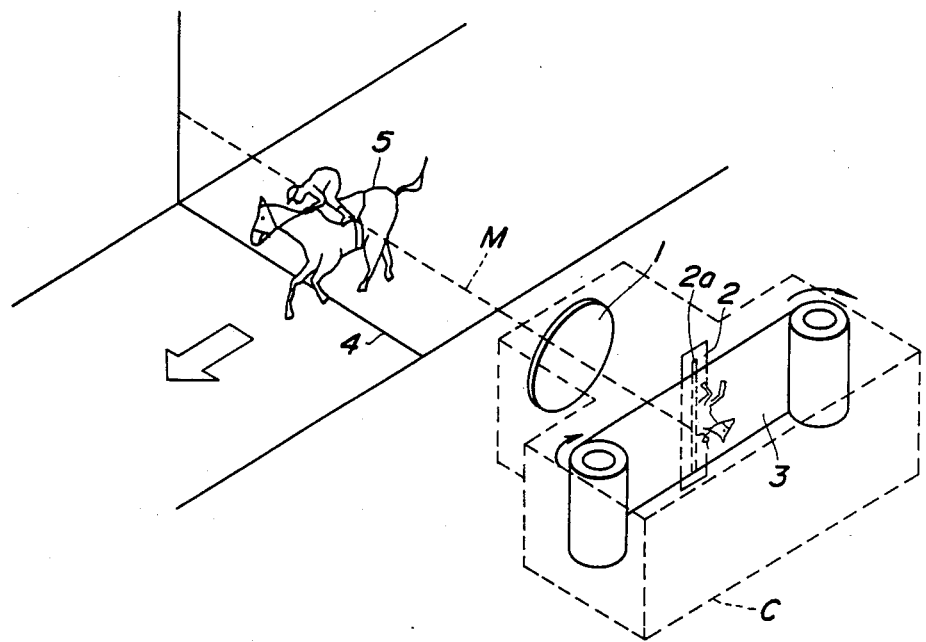
FIG. 1 shows a schematic structure of the slit camera of the prior art.
Figure 2:
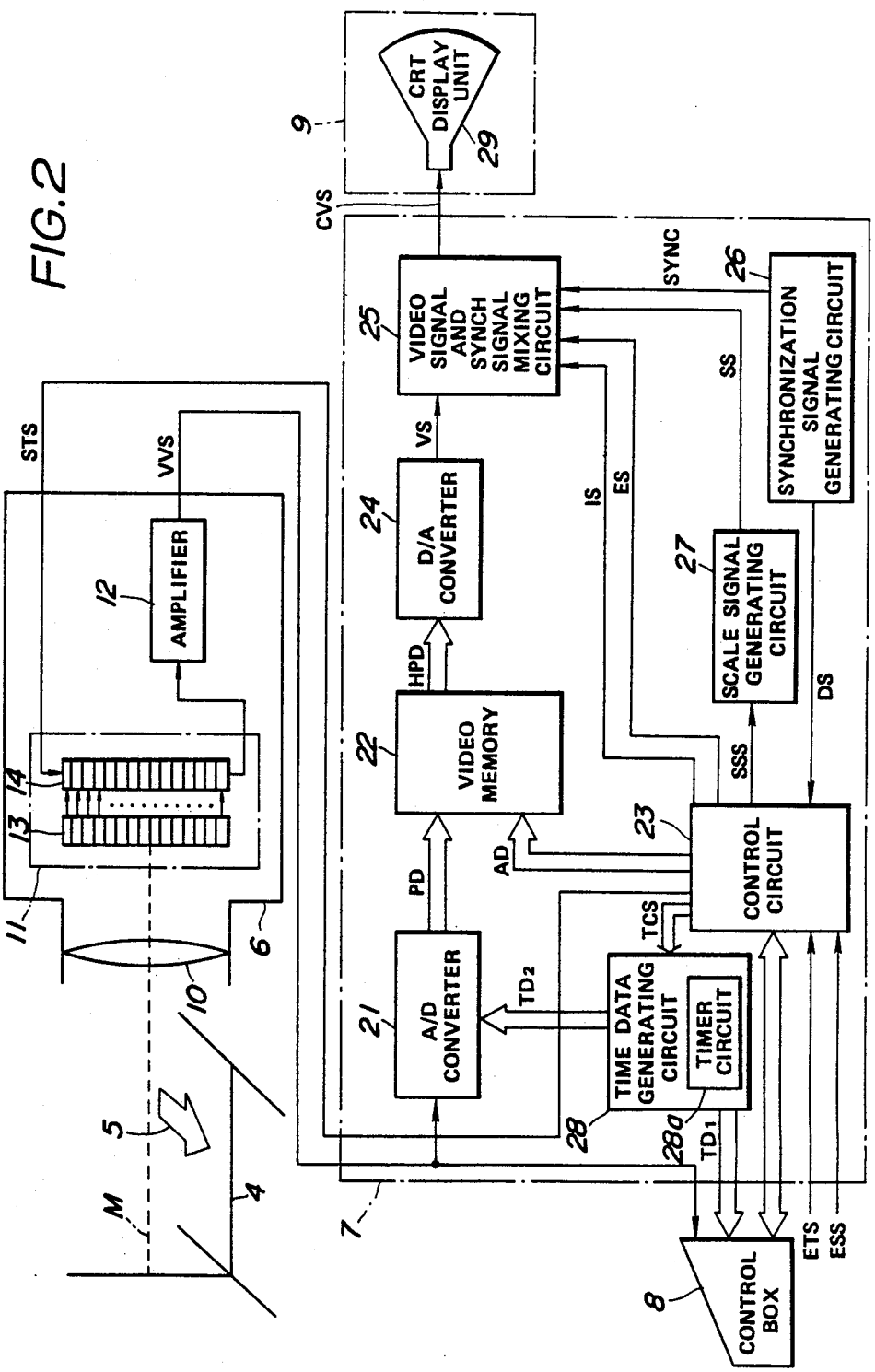
FIG. 2 is a block diagram showing constitution of an electronic camera apparatus for recording and reproducing moving object images according to the first embodiment of the invention.

Referring to FIG. 2, the electronic camera apparatus for recording and reproducing moving object images shown in this figure consists of several main sections: a line sensor camera 6; a picture image storage device 7; a control box 8; and a monitor TV 9. The line sensor camera 6 is located on an unobstructed line M parallel to the goal line 4, whereas the others, i.e. the picture image storage device 7, the control box 8 and the monitor TV 9, are disposed where the judge conveniently makes a decision, such as in a building.

The line sensor camera 6 consists of a lens 10, a CCD (charge coupled device) line scan image sensor 11

(called line sensor hereafter), and an output amplifier 12.

The line sensor 11 includes a photoelectric transfer section 13 having a photosensitive device for 512 picture elements, and includes an output shift register section 14. The line sensor 11 is arranged so as to be scanned perpendicularly to the goal line 4.

An image of the moving object 5 passing above the goal line 4 is formed on the photoelectric transfer section 13 through the lens 10, and processed in the following manner. The image is converted into electric signals by the photoelectric transfer section 13, and thereafter transmitted, in parallel, to the output shift register section 14 with every picture element synchronously with a scanning timing signal STS supplied by the external device. The thus processed signal is outputted in series from the output shift register section 14 to the output amplifier 12 synchronously with the scanning timing signal STS, and amplified by the output amplifier 12 to be outputted as a vertical scan video signal VVS.

There will now be described below the picture image storage device 7. The reference numeral 21 denotes an A/D (analogue/digital) converter for converting an analogue vertical scan video signal VVS supplied from the line sensor camera 6 into a 6-bit digital picture element data PD corresponding to every density (i.e. brightness) of the picture element; and 22 a video memory successively storing the picture element data PD outputted from the A/D converter 21 under the control of the control circuit 23 described below, the video memory having a memory capacity which can store sixteen frames (pictures) of the 6-bit picture element data which can represent 64 levels of the density information for one picture element.

In this case, each frame is constituted by horizontal 512 dots × vertical 512 dots in the write operation.

The reference numeral 23 denotes a control circuit for controlling the supply of address data AD to the video memory 22, writing and reading the picture element data PD, and the like.

In this case, each frame is constituted by horizontal 512 dots × vertical 489 dots in the read operation.

The reference numeral 24 denotes a D/A (digital/analogue) converter for converting horizontal read picture element data HPD read out from the video memory 22 by the control circuit 23, into a video signal VS; 25 a video signal and synchronization signal mixing circuit for mixing the video signal VS with a composite synchronization signal SYNC and a scale signal SS to output a composite video signal CVS; 26 a synchronization signal generating circuit for generating the composite synchronization signal SYNC and a synchronization signal DS corresponds to the composite synchronization signal SYNC; 27 a scale signal generating circuit for generating a scale signal SS in response to a scale set signal SSS; and 28 a time data generating circuit for generating an elapsed time data TD in response to a timer control signal TCS supplied from the control circuit 23, the time data generating circuit 28 having a timer 28a.

Figure 3:
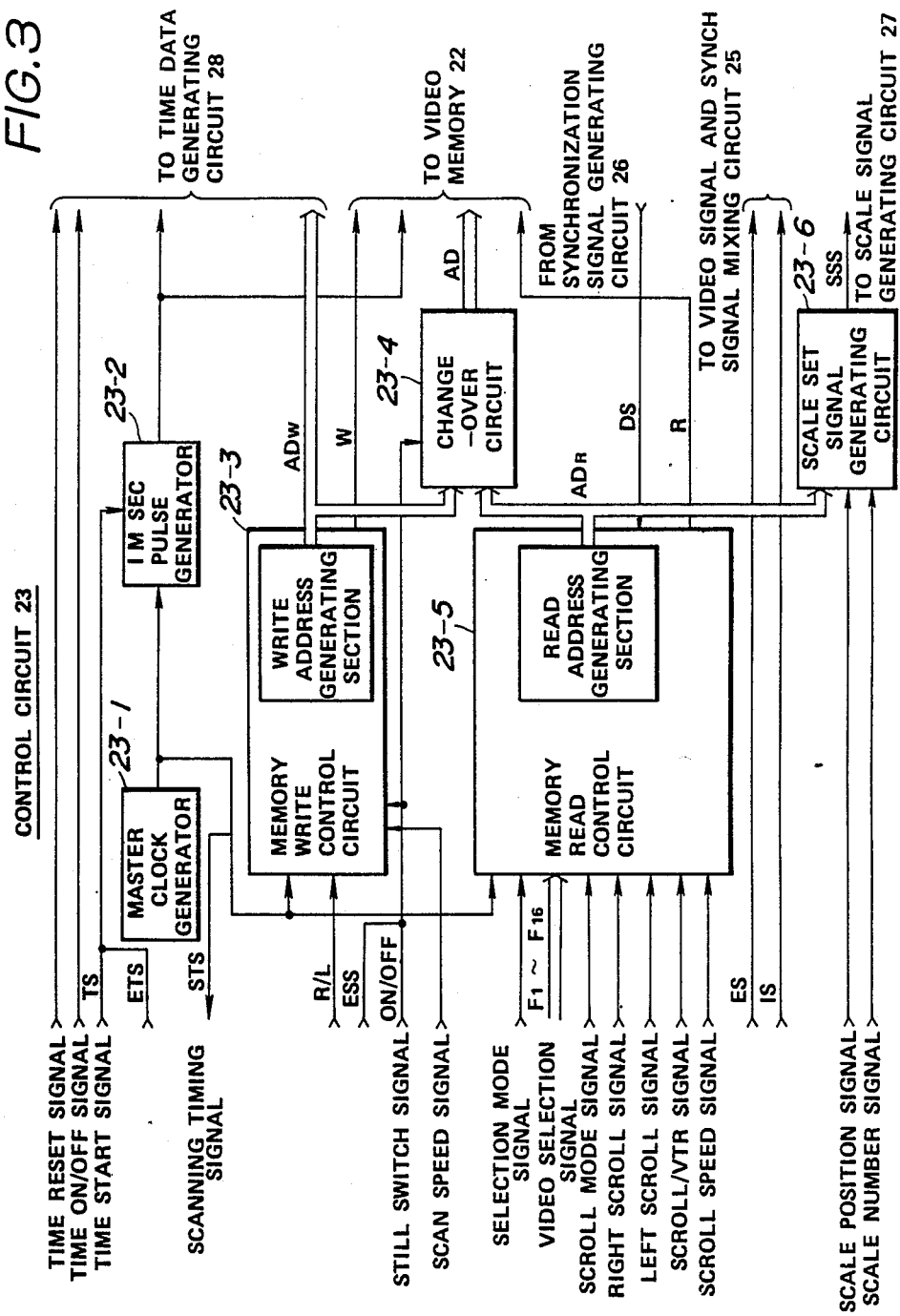
FIG. 3 is a circuit diagram of the control curcuit 23 of the electronic camera apparatus for recording and reproducing moving object images shown in FIG. 2.
Figure 4:
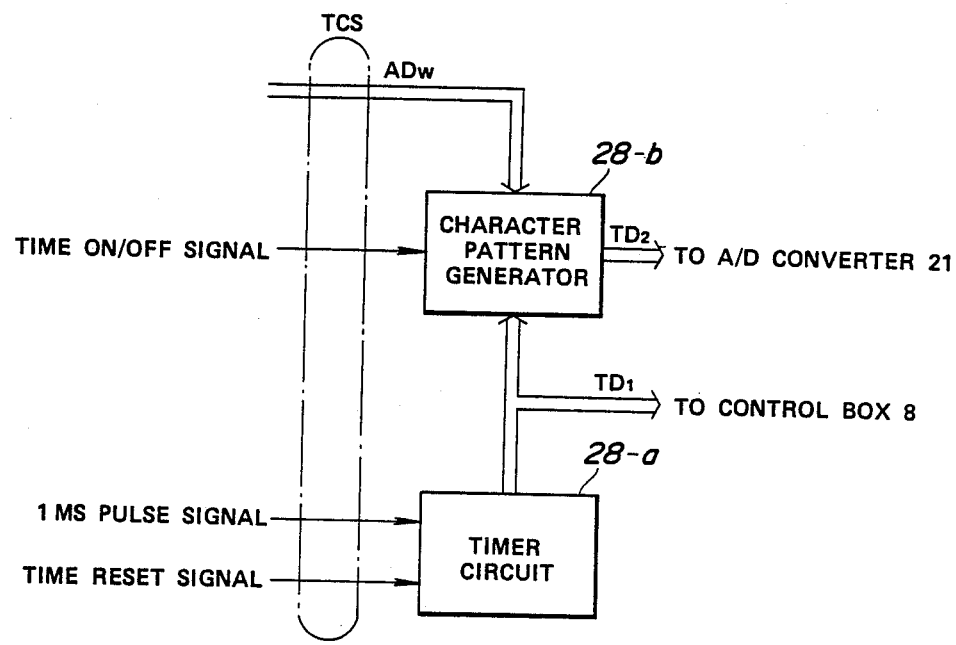
FIG. 4 is a circuit diagram of the time data generating circuit 28 of the electronic camera apparatus for recording and reproducing moving object images shown in FIG. 2.

FIGS. 3 and 4 show respectively detailed constitutions of the control circuit 23 and the time data generating circuit 28.

Referring to FIG. 3, the control circuit 23 includes a master clock generator 23-1, a 1-msec pulse generator 23-2, a write memory drive signal generating circuit 23-3, a change-over circuit 23-4, a read memory drive signal generating circuit 23-5, and a scale set signal generating circuit 23-6.

The master clock generator 23-1 transmits a clock signal with a very high frequency to the 1-msec pulse generator 23-2, the write memory drive circuit 23-3 and the read memory drive circuit 23-5.

The 1-msec pulse generator 23-2 operates when receiving a time start signal (TS) from the control box 8 or an external time start signal (ETS) from the external device. The 1-msec pulse generator 23-2 receives the clock signal from the master clock generator 23-1, generates a pulse train with a pulse separation of 1 msec in response to the clock signal, and transmits such a pulse train with a pulse separation of 1 msec to the time data generating circuit 28.

The write memory drive circuit 23-3 operates when receiving a still signal from the control box 8 or an external still signal (ESS) from the external device. The write memory drive circuit 23-3 transmits the scanning timing signal (STS) with a pulse separation determined by a scan speed set signal from the control box 8 to the output shift register 14, and transmits a writing signal W to the video memory. Furthermore, the write memory drive circuit 23-3 transmits, from a write address generating section provided therein, a write address signal (ADw) to the change-over circuit 23-4 and the time data generating circuit 28 in response to the scan speed set signal and a right/left assigning signal (R/L) from the control box 8.

This address signal (ADw) is to successively assign write addresses for the video memory 22: for example, when the right/left assigning signal (R/L) is the right (R), there are assigned address 1, address 2, address 3, . . . , address (512×512), . . . , and address (512×512×16); and when the right/left assigning signal (R/L) is the left (L), there are assigned, in contrast with above, address (512×512×16), . . . , address (512×512), . . . , address 3, address 2, and address 1.

The read memory drive signal generating circuit 23-5 operates when receiving video selection signals ($F_1$ to $F_{16}$) in addition to a selection mode signal from the control box 8, or receiving a scroll/VTR ON signal in addition to a scroll mode signal. The read memory drive signal generating circuit 23-5 receives the master clock signal from the master clock generator 23-1 and the synchronization signal DS from the synchronization signal generating circuit 26, and outputs a read address signal (ADr) and a read signal (R).

Stating in detail, a read address generating section in the read memory drive signal generating circuit 23 outputs the read address signal (ADr) for forming one picture designated by the selection signal (any one of $F_1$ to $F_{16}$), when receiving the selection signals (one of $F_1$ to $F_{16}$) in addition to the selection mode signal. On the other hand, the read address generating section outputs the read address signal (ADr) allowing the picture to move from the first picture designated by $F_1$ to the sixteenth picture designated by $F_{16}$, when receiving the scroll/VTR ON signal in addition to the scroll mode signal. These address signals (ADr) are transmitted to the video memory 22 through the change-over circuit 23-4, or transmitted to the scale set signal generating circuit 23-6.

The address signal (ADr) allows data to be read out from addresses on the video memory 22 to form one still picture repeatedly: for example, when receiving the selection signal $F_1$ in addition to the selection mode signal, data are read in the following order: address 1, address 513, address 1025, address 1537, ..., address (512×511+1), address 2, address 514, address 1026, address 1538, ..., address (512×511+2), address 3, address 515, ..., address (512×511+3), ..., address 512, address 1024, address 1536, ..., address (512×512), address 1, ..., address (512×512), address 0, ..., address (512×512), ....

On the other hand, when receiving the scroll/VTR ON signal in addition to the scroll mode signal, data are read in the first stage, like the selection mode above, in the following order: address 1, ..., and address (512×512). Next, data are read, to move the picture horizontally with a small distance, in the following order: address 513, address 1025, address 1537, ..., address (512×511+1), address (512×512+1), address 514, address 1026, address 1538, ..., address (512×511+2), address (512×512+2), address 515, ..., address (512×512+3), address 516, ..., address (512×512+4), ..., address 1024, ..., and address (512×512+512). Next, data are read, to further move the picture horizontally, from the addresses for next one picture starting from address 1025, thereafter from the addresses for one picture starting from the address 1537 and so on, to successively form pictures which are shifted horizontally.

It is noted that, in this case, the direction and the speed of the scroll can be determined respectively by the scroll right/left designating signal and the scroll speed set signal.

The change-over circuit 23-4 receives the write address signal (ADw) from the write memory drive circuit 23-3 and the read address signal (ADr) from the read memory drive signal generating circuit 23-5. The change-over circuit 23-4 transmits the write address signal (ADw) to the video memory 22 when receiving the still ON signal, and transmits the read address signal (ADr) to the video memory 22 when receiving the still OFF signal.

The scale set signal generating circuit 23-6 receives the read address signal (ADr), and transmits a scale set signal (SSS) to the scale signal generating circuit 27. The scale set signal (SSS) allows a luminance signal to be generated at the timing that such a luminance signal is superposed upon the data read out from the predetermined address of the memory 22. The luminance signal forms a number of scale lines (i.e. vertical lines) with equal distances, to represent the standard positions on the picture. In this case, the positions of the scale lines are designated by a scale position signal from the control box 8; the number of the scale lines within a certain distance is designated by a scale number signal.

It is noted that the control circuit 23 is provided with two short-circuit lines: a short-circuit line receiving a time ON/OFF signal and a time reset signal from the control box 8 and transmitting them directly to the time data generating circuit 28; and a short-circuit line receiving an erase signal (ES) and a negative/positive inversion signal (IS) and transmitting them directly to the video signal and synchronization signal mixing circuit 25.

FIG. 4 shows a detail of the time data generating circuit 28, which consists of a timer circuit 28-a and a character pattern generator 28-b.

The timer circuit 28-a counts 1-msec pulses supplied from the control circuit 23, and transmits the counted result to the character pattern generator 28-b, and transmits the counted result as a signal for the display (TD1) to the control box 8.

The count value in the timer circuit 28-a is reset by the timer reset signal.

The character pattern generator 28-b receives the write address signal (ADw) from the control circuit 23 and the count signal from the timer circuit 28-a, and transmits a time display luminance signal (TD2) to the A/D converter 21. The time display luminance signal (TD2) forms a character pattern of time corresponding to the count value.

It is noted that the write address signal (ADw), the time ON/OFF signal, the 1-msec pulse signal and the time reset signal are collected into one signal to form the timer control signal (TCS), and transmitted to the time data generating circuit 28.

Figure 5:
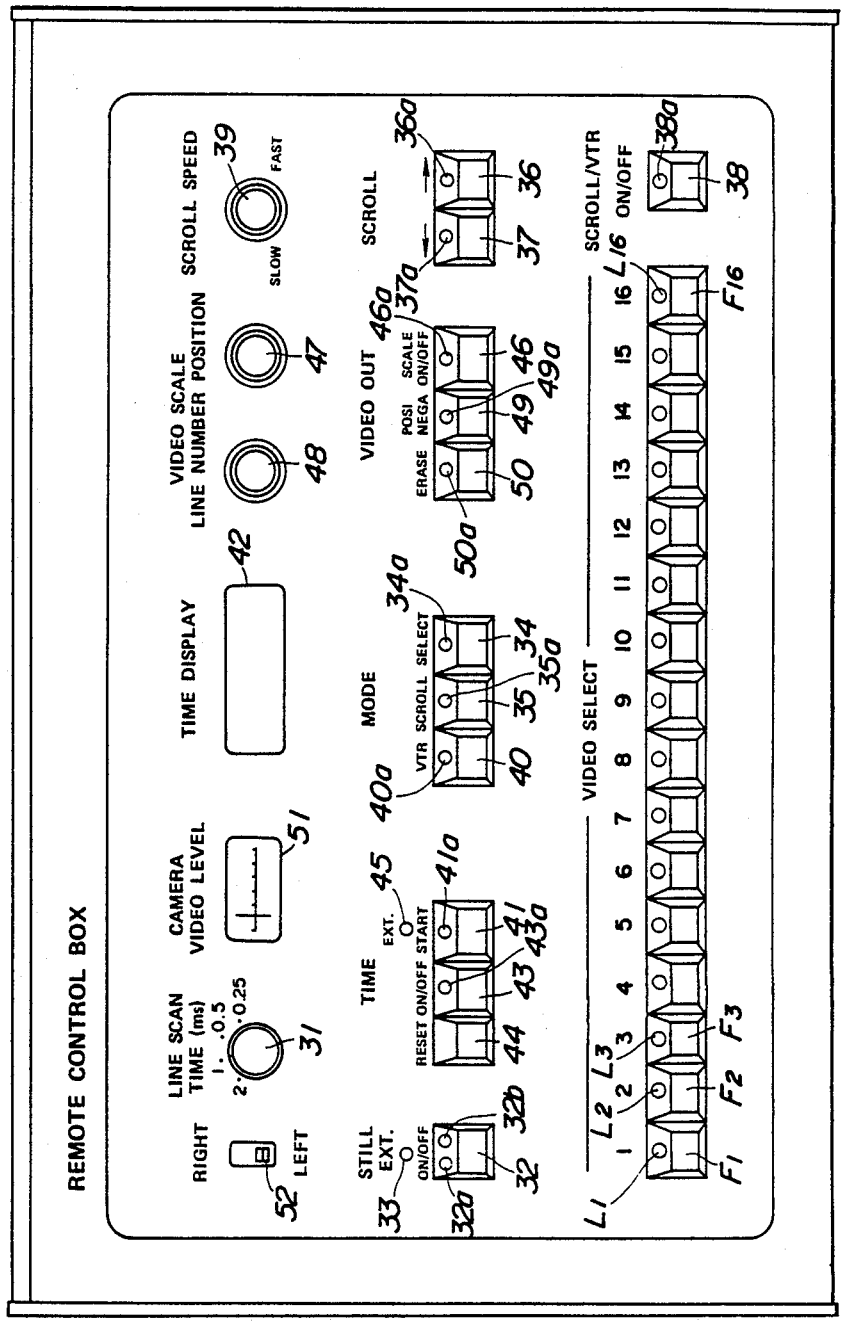
FIG. 5 shows detailed constitution of the control box 8 of the electronic camera apparatus for recording and reproducing moving object images shown in FIG. 2.

FIG. 5 shows a detail of the control box 8, which controls various operations for the control circuit 23.

Referring to FIG. 5, the reference numeral 31 denotes a line scan time change-over switch for changing the scan speed for every line of the line sensor 11 in the line sensor camera 6. The switch 31 changes the scan speed into any one of 2 msec (0.5 kHz), 1 msec (1 kHz), 0.5 msec (2 kHz) and 0.25 msec (4 kHz). The control box 8 outputs the signal STS representing the scan speed selected by the switch 31.

The reference numeral 32 denotes a still swich. When the still switch 32 is pushed, the still switch signal becomes "ON" to secure the write mode, so that there starts writing of the picture element data PD obtained by the A/D converter 21 on the video memory 22.

When the still switch 32 is pushed during the write mode, the writing is interrupted temporarily. And when the still switch is pushed again, the write mode is recovered again. In completion of the writing for sixteen frames, the write mode is released.

The still switch 32 is provided with display lamps 32a and 32b: the display lamp 32a is lighted during the write mode; the display lamp 32b is lighted while the writing of the picture element data PD on the video memory is being carried out during the write mode.

During the write mode, any ON/OFF operation for the other switches is made invalid.

The reference numeral 33 denotes a display lamp for displaying the turning of the still signal change-over switch to the external. During its lighting, the apparatus is made the write mode by the external still signal ESS supplied from the external device in place of the still switch 32 described above.

$F_1$ to $F_{16}$ denote video selection switches for selecting any picture, which is desired to display on the screen of the monitor TV 9, from a plurality of the pictures stored temporarily in the video memory 22. $L_1$ to $L_{16}$ denote video display lamps for displaying the number of the picture which is during writing or reading.

The reference numeral 34 denotes a selection mode switch. When the switch 34 is turned on, the mode selection signal becomes "ON"; the apparatus is made the selection mode and a display lamp 34a is lighted.

During the selection mode, the selection of the pictures can be done by any of the video selection switches $F_1$ to $F_{16}$.

In this case, when the still switch 32 is pushed to secure the write mode, the apparatus is automatically initialized to the selection mode.

The reference numeral 35 denotes a scroll mode switch. When the scroll mode switch 35 is turned on, the scroll mode signal is outputted; the apparatus is made the scroll mode and a display lamp 35a is lighted. During the scroll mode, the scroll operation can start from the picture selected by one of the video selection switches $F_1$ to $F_{16}$.

In this case, after the switch 35 is turned on to secure the scroll mode, the ON/OFF operations for the video selection switches $F_1$ to $F_{16}$ are made invalid to secure no selection of the pictures.

The reference numerals 36 and 37 denote scroll direction designating switches. When the scroll direction designating switch 36 is pushed, the right scroll signal is outputted and a display lamp 36a is lighted, so that the moving direction of the picture is set the right. On the other hand, when the scroll direction designating switch 37 is pushed, the left scroll signal is outputted and a display lamp 37a is lighted, so that the moving direction of the picture is set the left.

The reference numeral 38 denotes a scroll/TV switch for controlling start and stop of the scroll and the below-described VTR recording during the scroll mode and the VTR (video tape recorder) recording mode. When the switch 38 is turned on, the scroll/VTR ON signal is outputted and a display lamp 38a is lighted.

When the scroll direction designating switch 36 or 37 is turned on and the scroll/VTR switch 38 is further turned on, the picture is displayed on the screen of the monitor TV while moving in the designated direction.

The moving speed of the picture is set by a scroll speed set volume 39.

The reference numeral 40 denotes a VTR mode switch. When the switch 40 is turned on, the apparatus is made the VTR recording mode and a display lamp 40a is lighted.

When the scroll/VTR switch 38 is turned on, the pictures are automatically scrolled, with a moving speed set by the scroll speed set volume 39, successively from the first picture corresponding to the video selection switch $F_1$. After completion of the scroll, the screen is made blank for a certain time and the display lamp 38a becomes off to indicate the completion of one cycle of the VTR recording mode.

During one cycle of the VTR recording mode, the ON/OFF operation for the scroll/VTR switch 38 is made invalid.

During the VTR recording mode, if the composite video signal CVS outputted from the picture image storage device 7 is supplied to the video signal input terminal of the VTR, the above-described scroll pictures are recorded in the VTR.

The reference numeral 41 denotes a time start switch. When the switch 41 is turned on, the time start signal STS is outputted; the timer 28a in the time data generating circuit 28 starts the clocking operation. As the result, the elapsed time data TD is transmitted at every 1/10 second from the time data generating circuit 28 respectively to an elapsed time display device 42 of the control box 8 and to the A/D converter 21. When the timer 28a is under the clocking operation, a display lamp 41a is lighted.

The reference numeral 43 denotes a time ON/OFF switch. When the switch 43 is turned on, the time ON/OFF signal becomes "ON" and a display lamp 43a is lighted, so that the elapsed time data TD outputted from the time data generating circuit 28 is superposed upon the picture element data PD in the A/D converter 21 during the write mode, and written on the video memory 22.

The reference numeral 44 denotes a time reset switch. When the switch 44 is pushed, the time reset signal is outputted and the timer 28 is reset.

The reference numeral 45 denotes a display lamp for displaying the turning of the time start signal change-over switch to the external. During lighting of the lamp 45, the timer 28a starts the clocking operation by the external time start signal ETS supplied from the external device in place of the above-described time start switch 41.

The clocking operation of the timer 28a stops in completion of the write mode.

The reference numeral 46 denotes a video out scale ON/OFF switch. When the switch 46 is turned on, a display lamp 46a is lighted and the scale signal SS generated by the scale signal generating circuit 27 is superposed upon the video signal VS in the video signal and synchronization signal mixing circuit 25, so that vertical video scale lines appear on the screen.

In this case, there are collected a set value (scale position signal) corresponding to the horizontal positions of the scale lines set by a video scale position set volume 47, and another set value (scale number signal) corresponding to the number of the scale lines set by a video scale line number set volume 48, to form the scale set signal SSS, which is supplied to the scale signal generating circuit 27 through the control circuit 23.

The reference numeral 49 denotes a video out positive/negative change-over switch. When the switch 49 is pushed and thus a display lamp 49a is lighted, the inversion signal IS is supplied to the video signal the synchronization signal mixing circuit 25 through the control circuit 23, and the composite video signal CVS is inverted, so that the negative picture appears on the screen of the monitor TV 9.

When the switch 49 is pushed again, the display lamp 49 becomes off and the normal positive picture appears on the screen.

The reference numeral 50 denotes a video out erase switch. When the switch 50 is turned on and thus a display lamp 50a is lighted, the erase signal ES is supplied to the video signal and synchronization signal mixing circuit 25 through the control circuit 23, and the composite video signal CVS is made a blank signal in the circuit 25.

The reference numeral 51 denotes a video signal level meter for displaying the peak value of the vertical scan video singal VVS outputted from the line sensor camera 6. This level meter 51 is used for setting the diaphragm value for the lens 10 of the line sensor camera 6. The reference numeral 52 denotes a right/left change-over switch, which allows the signal R/L corresponding to the change-over position to be outputted. This switch 52 is turned to the right in the case that the moving object 5 passes before the line sensor camera 6 from the right to the left; the switch 52 is turned to the left in the opposite case. Thus, there is changed the assignment order for addresses in writing the picture element data PD on the video memory, so that the image of the moving object is displayed on the screen of the monitor TV 9 with the same direction as the actual moving object 5.

There will now be described below the procedure for a decision of arrival order for a horse race by using the video recording and reproducing apparatus having the constitution described above.

First, the line scan time change-over switch 31 is operated so that the scan speed of the line sensor 11 is set in response to the estimated moving speed of the race horse (moving object 5).

The reason why the scan speed is set is that: if the scan speed of the line sensor 11 is too fast as compared with the moving speed of the race horse, a horizontally elongated (in the moving direction of the race horse) image than the actual image of the race horse would be written on the video memory 22; conversely, if the scan speed is too slow, a horizontally shortend image would be written on the video memory 22.

Next, the white object is photographed by the line sensor camera 6 to adjust the diaphragm value for the line sensor camera 6 so that the indicator of the level meter 51 does not exceed the predetermined value. The thus adjusted line sensor camera 6 is located on the unobstructed line M above the goal line 4. In addition, the right/left change-over switch 52 is turned to an appropriate position in response to the moving direction of the race horse. If it is desired to obtain the elapsed time together with the image, the time ON/OFF switch 43 is turned on.

Furthermore, it is required to confirm that the display lamps 33 and 45 are off, and the still signal change-over switch and the time start signal change-over switch are not turned to the external.

Next, the time start switch 41 is turned on at the time of starting the race. Thus, the elapsed time from the start is successively displayed on the elapsed time display device 42 in 1/10 seconds.

Thereafter, the still switch 32 is turned on just before the lead horse passes above the goal line 4.

Thus, the apparatus is made the write mode; the vertical scan video signal VVS supplied from the line sensor camera 6 is converted to the picture element data PD by the A/D converter 21. The picture element data PD is successively written on the video memory 22.

Figure 6:
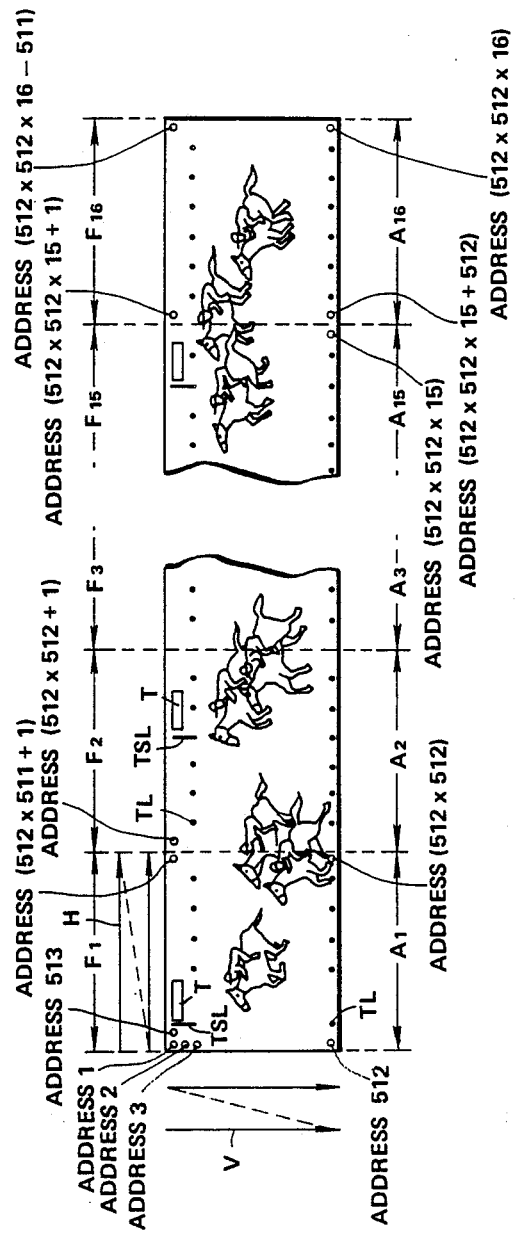
FIG. 6 shows an example of the picture image which is displayed on the monitor TV 9 shown in FIG. 2.

In this case, the picture element data PD obtained by the A/D converter 21 is written on successively from the first storage area $A_1$ in the video memory 22 corresponding to the video selection switch $F_1$ along the direction indicated by an arrow V in FIG. 6.

In completion of writing of the picture element data PD on the sixteenth storage area $A_{16}$ in the video memory 22 corresponding to the video selection switch $F_{16}$, the write mode is released.

If the time ON/OFF switch 43 has been turned on in this case, there are written on the video memory 22, together with the horse image, the time indicating standard line TSL, the time T representing the elapsed time from the start of the race to the time indicating standard line TSL, and the time indicating line TL represents the time interval for every 1/10 second (noting that if the scan speed is 0.25 msec, 1/100 second) from the time indicating standard line TSL.

Next, after the race, the judge selects, from the video selection switches $F_1$ to $F_{16}$, one video selection switch corresponding to the desired picture, and pushes it to display the desired picture on the screen of the moniter TV 9, to make a decision of arrival order.

In this case, if the video selection switch $F_1$ is selected for example, the picture element data PD for horizontal 512 dots×vertical 489 dots are read out from the first storage are $A_1$ in the video memory 22 along the direction (horizontal direction) indicated by an arrow H in FIG. 6, and supplied to the D/A converter 24 as the horizontal read picture element data HPD.

Next, the horizontal read picture element data HPD is converted to the video signal VS by the D/A converter 24, and the video signal VS is made the composite video signal CVS by the video signal and synchronization signal mixing circuit 25 and supplied to the monitor TV 9.

Thus, the first picture corresponding to the video selection switch $F_1$ appears on the screen of the monitor TV 9.

If the scroll mode switch 35 is first pushed to secure the scroll mode and thereafter the desired video selection switch, one of $F_1$ to $F_{16}$, is pushed, the scroll operation can start from the selected picture. In addition, if the scroll direction is designated by the scroll direction designating switch 36 or 37 and the scroll/VTR switch is pushed, the picture is scrolled in the designated direction with the moving speed set by the scroll speed set volume 39.

The judge may make a decision of arrival order while seeing the scrolled picture.

The embodiment described above offers the following advantages: the decision of arrival order is carried out on the screen of the monitor TV 9 promptly after all the horses have arrived the goal; and the desired picture is selected, for example, from the picture including the lead horse through the picture including the last horse, and displayed on the screen of the monitor TV 9, so that the decision working is carried out rapidly and easily.

What is claimed is:

1. A video recording and reproducing apparatus comprising:
   a. a line sensor camera having a line scan image sensor which is scanned along a predetermined standard line and receives an image of a plurality of moving objects passing the standard line and having an image pick-up section having means for picking up the image of at least two moving objects, said sensor having a scan speed set in response to an estimated speed of said objects;
   b. first converter means for successively converting a one vertical scanning line output video signal of the line sensor camera into picture element data;
   c. storage means for successively storing the picture element data, for a plurality of pictures, supplied from the first converter means;
   d. selection means for selecting a desired picture from the plurality of the pictures;
   e. read means for successively reading the picture element data corresponding to the selected picture by the selection means from the picture element data for the plurality of the pictures written on the storage means;
   f. second converter means for converting the picture element data read by the read means into a video signal; and
   g. display means for displaying a continuous picture image of said at least two moving objects moving in accordance with time on said one vertical scanning line video signal supplied to said display means from the second converter means.

2. A video recording and reproducing apparatus according to claim 1, further comprising scan speed change-over means for changing a scan speed of the line scan image sensor.

3. A video recording and reproducing apparatus according to claim 1, further comprising:
   scale signal generating means for generating a scale signal corresponding to scale lines parallel to a moving directions of the line scan image sensor;
   signal mixing means for mixing the scale signal with the video signal supplied to the display means; and scale line position set means for setting positions of the scale lines displayed on a screen of the display means.

4. A video recording and reproducing apparatus according to claim 1, further comprising a time data generating circuit which starts a counting operation in response to a start signal indicating a start of a race, and successively generates time data corresponding to an elapsed time from the start of the counting operation, wherein the first converter means for successively converting the output video signal of the line sensor camera into the picture element data has a function of superposing the time data generated by the time data generating circuit with the picture element data.

5. A video recording and reproducing apparatus according to claim 1, wherein the line sensor camera includes: a lens for forming the image of the moving object passing the standard line; and a charge coupled device line scan image sensor having a shift register which has a plurality of photoelectric transfer devices for converting intensities of lights of respective picture elements, into which an image-formation surface of the lens is divided, into electric signals, receives the electric signals outputted from the respective photoelectric transfer devices, and successively transmits the electric signals to outside in response to a scanning timing signal supplied from outside, and an amplifier for amplifying an output signal from the shift register and transmitting it as the video signal to outside.

6. A video recording and reproducing apparatus according to claim 1, wherein the first converter means for successively converting an output video signal of the line sensor camera into picture element data is an analog to digital converter for converting analog values into 6-bit digital values.

7. A video recording and reproducing apparatus according to claim 1, wherein the storage means is constituted by a combination of ninety-six 256 kbit random access memories.

8. A video recording and reproducing apparatus according to claim 1, wherein the second converter means for converting the picture element data read by the read means into a video signal is a digital to analog converter.

9. A video recording and reproducing apparatus according to claim 1, wherein the display means for displaying a picture image in response to the video signal supplied from the second converter means is a cathode ray tube display.

* * * * *